United States Patent [19]

Gappa et al.

[11] 4,255,072
[45] Mar. 10, 1981

[54] FLOW LEADING FLOOR FOR WHIRL CHUTES

[75] Inventors: Günther Gappa, Gelsenkirchen; Harald Jüntgen, Essen-Heisingen; Jürgen Klein, Essen-Überruhr; Peter Schulz, Essen-Steele, all of Fed. Rep. of Germany

[73] Assignee: Bergwerksverband GmbH, Essen, Fed. Rep. of Germany

[21] Appl. No.: 929,320

[22] Filed: Jul. 31, 1978

[30] Foreign Application Priority Data

Jan. 8, 1978 [DE] Fed. Rep. of Germany ....... 2734608

[51] Int. Cl.³ .............................................. B65G 53/20
[52] U.S. Cl. .................................... 406/89; 34/57 E; 422/144; 422/145
[58] Field of Search ................... 302/30, 46; 34/57 A, 34/57 C, 57 E; 423/DIG. 16; 422/139, 144, 145; 165/104 F; 110/245, 263; 122/4 D; 55/77, 390; 209/466, 474; 406/89, 92

[56] References Cited

U.S. PATENT DOCUMENTS

3,226,841  1/1966  Mark ................................... 34/57 A

FOREIGN PATENT DOCUMENTS

916565  1/1963  United Kingdom .................... 34/57 A

Primary Examiner—Jeffrey V. Nase
Attorney, Agent, or Firm—Michael J. Striker

[57] ABSTRACT

The floor in a whirl (i.e. fluidizing) chute for treating solid particles in a vortex of gas advancing in longitudinal direction of the chute comprises a grate for introducing into the chute the whirling gas to impart to the particles a whirling motion in vertical direction and to advance the whirling particles in longitudinal direction, and at least one layer of filling bodies arranged on the grate in the direction of advance of the particles whereby the size of the filling bodies and the height of the layer is adjusted according to desired whirling speed of the treated particles.

9 Claims, 14 Drawing Figures

PRIOR ART

FLOW LEADING FLOOR FOR WHIRL CHUTES

BACKGROUND OF THE INVENTION

The invention is concerned generally with whirl chutes (i.e. fluidized-bed channels) for treating solid particles and more particularly it is concerned with flow leading floor for such chutes on which the treated particles are advanced under the influence of a vertical vortex of a gas in longitudinal direction from an inlet to the outlet of the chute.

For treatment of solid particles such as for example for drying wet loose material, for regeneration of loaded absorption material or for chemical reactions, such as for example gasification or combustion of fine grained coal, there are employed preferably vortex or whirl chutes because of their advantageous material and heat exchange. In these chutes a whirling gas streams in vertical direction whereas the treated loose material advances or better to say flows under a constant vertical vortex movement along the whirl chute from its inlet to its outlet. It is desirable that the whirl (i.e. fluidizing) gas impart over the entire flow leading floor as uniform whirling condition as possible. A uniform whirling condition is obtained when the velocity of the whirling gas in any point of the whirl chute constantly amounts to a definite multiple preferably 1.2 to 2 times the actual whirling velocity of respective solid particles.

If due to the treatment the bulk density of the solid particles is changed during their travel through the whirl chute, so is changed also the velocity of the center of vortex of the particles along the whirl chute. As a consequence, at a constant velocity of the whirl gas along the whirl chute no uniform whirling condition of the solid particles can be attained. A typical example of a gradual reduction of the bulk density of the solid particles is regeneration of wet absorption materials such as aluminum oxide or activated carbon. In this case the change of the bulk density between the inlet and outlet of the whirl chute is mostly more than 50 percent. As a result uncontrollable and undesirable intermixtures, deformations and time delays of solid particles treated in the whirl chutes take place in such cases.

Even an incorporation of dams, narrow passages and the like in the whirl chutes does not result in the desired uniformity of the treatment of the solid particles.

SUMMARY OF THE INVENTION

It is therefore a general object of the present invention to overcome the aforementioned disadvantages.

More particularly, it is an object of the invention to provide an improved flow leading floor in vortex chutes that makes it possible to attain a uniform treatment of the loose material in the chute.

Another object of the invention is to provide an improved leading floor in the whirl (i.e. fluidizing) chute that enables a ready removal of any disturbances such as clogging that might occur during the operation of the chute.

In keeping with these objects, and others which will become apparent hereafter, one feature of the invention resides in a whirl (i.e. fluidizing) chute for treating loose materials, in the provision of a flow leading floor for the chute incorporating layers of filling bodies of different sizes and/or forming layers of different heights so as to adjust the velocity of the whirling gas.

For the assembly of flow leading floors of this kind filling bodies of all suitable configurations such as balls, pellets, rings, and so on are applicable, provided that they are not affected by the process taking place in the whirl bed; particularly suitable are for example balls of refractory material. Furthermore, the material of which the filling bodies are made should have a relatively high density so that they in no case be lifted and whirled by the gas vortex. A single layer of filling bodies can in practice have an arbitrary height. Generally, the height of the layer is between 3 to 50 centimeters, but at least the triple of the specific diameter of the filling bodies.

The flow leading floors of whirl chutes according to this invention have the advantage that in the case of clogging or other disturbances in the whirl bed they can be easily exchanged. Moreover, in contrast to leading floors made of metal they are not distorted when subject to temperature so that no marginal sealing imperfections or loosening of the bottom lower edge of the whirl chute take place.

For obvious reasons the diameter of the filling bodies has to be larger than the interspaces of the grate by which they are supported. In the case when the flow leading floor consists of several layers, it is advisable that in order to avoid intermixing between individual layers the diameters of the filling bodies in respective layers be larger than the cross-section of interstices between filling bodies of adjacent layers.

In special cases it may be desirable that the floors according to this invention be constructed of relatively small and/or light filling bodies. In such cases it is advantageous to cover such a layer of small and/or light filling bodies with another layer of heavier and/or larger filling bodies or with a sieve. A sieve loosely applied on the uppermost filling bodies does not influence the property of the floor according to this invention.

A particularly advantageous feature of the flow guiding floor in whirl chutes according to this invention resides in the fact that the floor can be constructed in different modifications. More particularly, it can be assembled so that its permeability to gas along the whirl chute is increased or reduced according to a predetermined pattern.

In order to achieve variable gas permeability in the flow leading floors in the chutes of this invention, it is necessary for example if it is desired to reduce the gas permeability in the direction toward the end of the chute to increase the number of filling bodies in vertical direction. This increase can be made either by decreasing the diameter of interstices and accordingly the diameter of filling bodies at the end of the chute while maintaining the height of the layer constant or by increasing the height of the layer while maintaining constant the size of the filling bodies; a combination of the two aforementioned measures is also possible if several layers are employed. Accordingly, when using several layers the portion of the layer made of smaller filling bodies is increased at the end of the chute relative to the combined height of the layer since obviously by this measure the gas permeability of the composite layer is reduced.

It is also possible by selecting different sizes of the filling bodies to create such a gas permeability of the floor of the chute that on blowing through the floor a single stream of gas has the effect that the loose material, that means the solid particles travelling along the whirl chute are always attacked at any point of their travel through the chute with such a velocity that always corresponds to the velocity of the oncoming flow of solid particles or to a definite multiple thereof.

Regenerations of activated carbon carried out by means of blowing floors in the chutes of this invention show that the carbon is substantially more protected than in the conventional whirl chutes. Losses due to abrasion are smaller since excessively powerful whirling is avoided. Moreover, the solid particles are particularly uniformly treated that means that the delay time spectra are more narrow. This effect is particularly important for the regeneration of activated carbon because the stand-by losses resulting due to protracted treatment period are held as low as possible.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
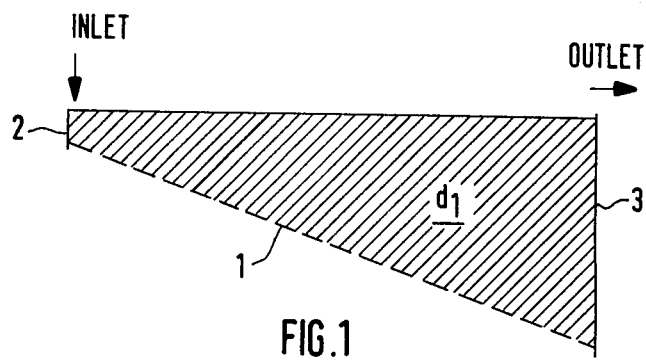
FIG. 1 is a cross-sectional front view of one embodiment of a flow guiding floor for vortex chutes according to this invention.

FIG. 1 shows a cross-sectional side view of a flow leading floor for a vortex or whirl (i.e. fluidizing) chute according to the invention. The floor in this embodiment consists of a sloping grate 1 extending along the entire length of the chute and supporting a single layer $d_1$ of filling bodies. The height of the layer increases linearly in the sloping direction of the grate and therefore gas permeability of the floor decreases in this direction that means from the left-hand inlet side 2 of the chute to the right-hand outlet side 3.

Figure 2:
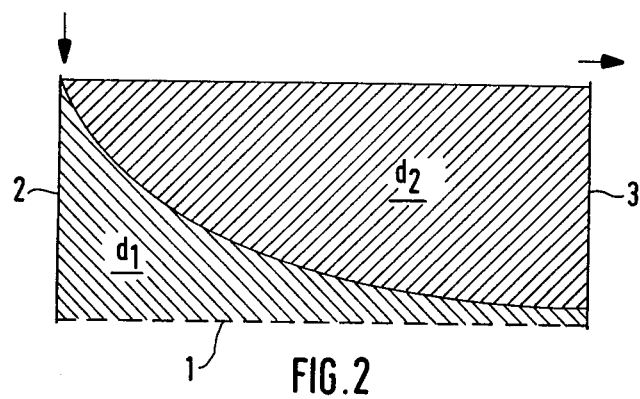
FIG. 2 is a cross-sectional front view of another embodiment of the floor for a vortex chute of this invention.

FIG. 2 shows another embodiment of the floor of this invention in which a horizontal bottom grate 1 supports two layers of filling bodies $d_1$ and $d_2$ whereby the average diameter of filling bodies $d_1$ is larger than the average diameter of filling bodies $d_2$. By means of this arrangement it is achieved that in the case of a horizontal grate the permeability of the thus created floor to gas blown into the chute from below is also reduced from the left side of the chute to the right side. The gas permeability changes gradually from the inlet side 2 to the outlet side 3 of the chute.

Figure 3:
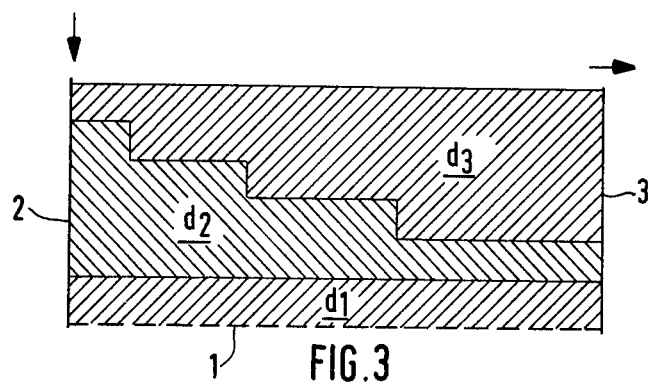
FIGS. 3 to 6 are modifications of the floor of FIG. 2.

FIG. 3 shows a multilayer flow leading floor for vortex chutes having a horizontally directed grate 1, a lowermost layer $d_1$ of filling bodies having a constant height and of two superposed layers of filling bodies $d_2$ and $d_3$ having a complementarily stepped height. The average diameter of the filling bodies $d_1$ in the lowermost layer is larger than the diameter of filling bodies $d_2$ and the latter is larger than the diameter of the uppermost filling bodies $d_3$. The lowermost layer of filling bodies prevents the superposed smaller filling bodies from subsiding through the grate and in addition it contributes to a more uniform blowing of the whirling gas against the superposed layers. The steplike arrangement of the upper layers is particularly suitable for charging the filling bodies into the whirl chute and by suitable selection of height and length of respective portions of the steplike layers it is possible to influence a similar change in the gas permeability as does the floor according to FIG. 2.

Figure 4:
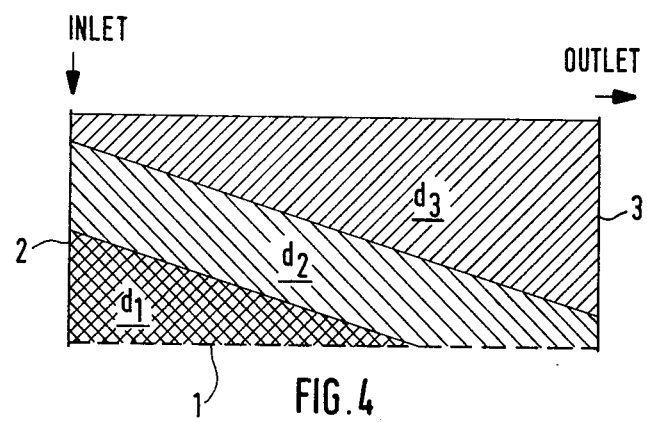

FIG. 4 shows a gas flow leading floor consisting of a horizontal grate 1 and of three layers of filling bodies $d_1$, $d_2$ and $d_3$ whereby average diameters of the filling bodies in the consecutive layers decrease in this order. This arrangement is particularly advantageous in the case when in the inlet range of the chute (the lefthand portion) a particularly high velocity of the whirl gas is required; instead of uniform inclination of the layers $d_1$ to $d_3$ it is of course possible to make a step-like arrangement of respective layers as shown in FIG. 3.

Figure 5:
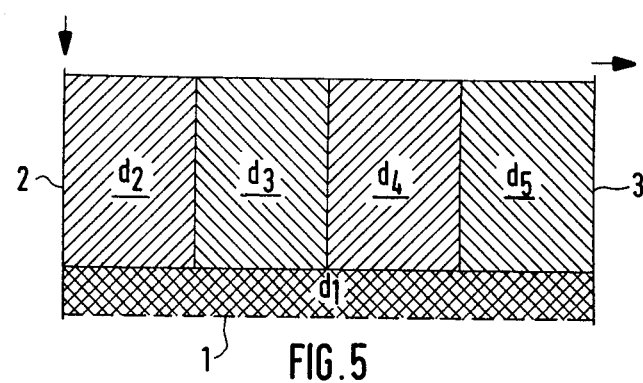

FIG. 5 shows a gas flow leading floor for whirl (i.e. fluidizing) chutes consisting of a horizontal grate 1 supporting a lowermost layer of filling bodies $d_1$ having a uniform height and a superposed layer of filling bodies $d_2$ to $d_5$ having also a uniform height. The average diameters of the filling bodies $d_2$ to $d_5$ in respective layer portions are consecutively decreased, in this case the diameter of $d_2$ is larger than $d_3$ is larger than $d_4$ is larger than $d_5$. Such arrangement also influences the change of the gas permeability (the permeability decreases from the left-hand side to the right-hand side). In constructing the gas flow leading floor according to this embodiment is carried out by means of sheet metal partitions that upon completion of the construction of the floor can be pulled out from the bulk material.

Figure 6:
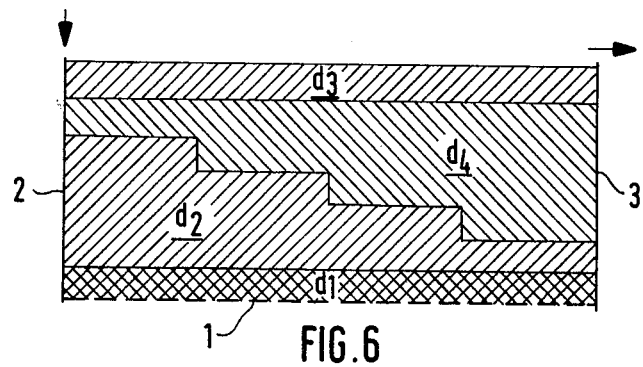

FIG. 6 shows a flow leading floor corresponding in principle to that of FIG. 3 but having an additional uppermost layer of filling bodies $d_3$ of constant height whereby $d_1$ is larger than $d_2$ is larger than $d_3$ is larger than $d_4$. Due to the fact that the uppermost layer consists of larger filling bodies than those lying underneath it is prevented that whirling motion is imparted to the filling bodies $d_4$.

FIGS. 7A to 8D refer to examples of regeneration of activated carbon by means of steam in a whirl chute according to this invention and to prior art respectively.

In an installation for cleaning waste water from a carbonizing plant is applied activated carbon having a bulk density of 400 grams per liter and an average grain size of 1.8 millimeters. After loading the bulk density of the wet activated carbon amounts to 795 grams per liter. This loaded activated carbon is to be regenerated by steam in a fluidizing chute the flow leading floor of which has a rectangular configuration at an area of 0.155 m$^2$ and a length of 770 millimeters. During the treatment period of 40 minutes in passing the whirl chute the activated carbon is supposed to be freed of water and organic load and at the outlet side of the chute it is supposed to have again a bulk density of 400 grams per liter. To minimize losses of the treated activated carbon, the velocity of the whirl gas at any point of the whirling layer is supposed to be the 1.5 multiple of the velocity of the whirling particles.

Figure 7A:
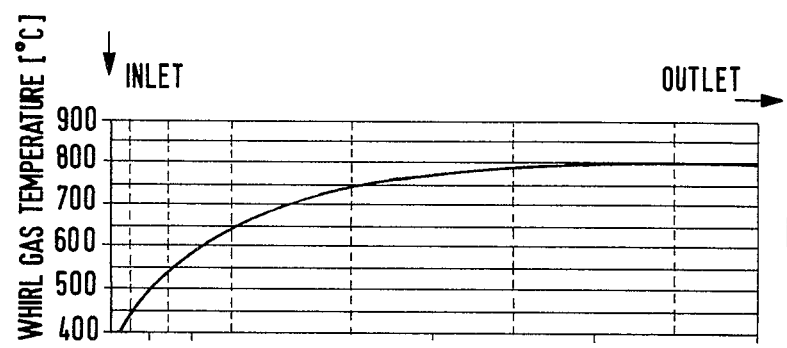
FIG. 7A is a plot diagram of the whirl gas temperature versus the length of the whirl chute.
Figure 7B:
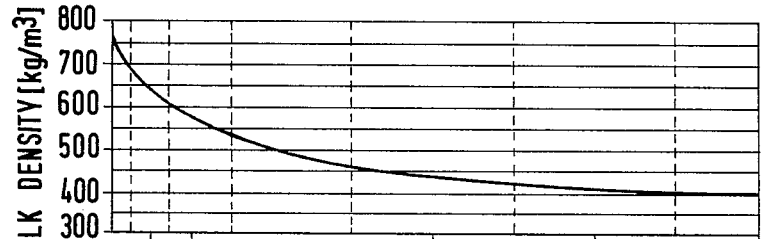
FIG. 7B is a diagram of the bulk density of the treated particles versus the length of the chute.
Figure 7C:
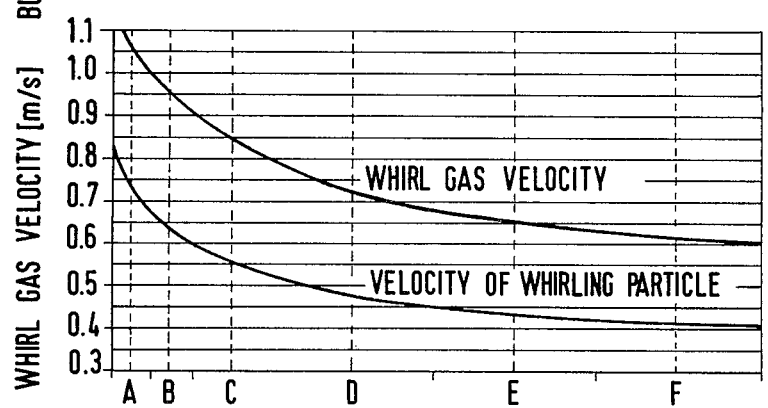
FIG. 7C is a plot diagram of fluidizing gas velocity versus the length of the chute.
Figure 7D:
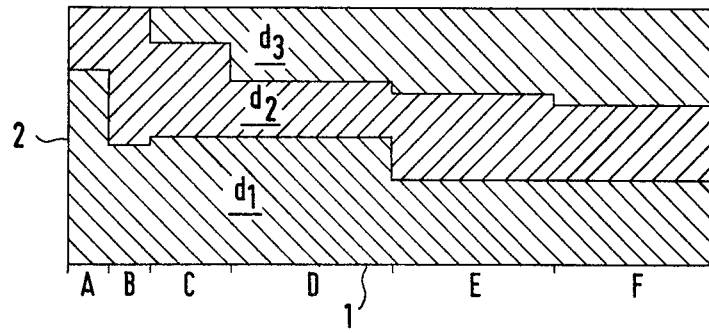
FIG. 7D is a cross-sectional side view of a multilayer flow leading floor for whirl chutes according to this invention.

By measurements it has been found that the temperature of whirling gas around the whirl chute continuously increases from 350° C. at the inlet side up to 800° C. at the outlet side (FIG. 7A). Against this the bulk density of the activated carbon decreases continuously from the inlet side to the outlet side of the chute from 795 grams per liter to 400 grams per liter (FIG. 7B). Consequently, as it has been determined by measurement, the velocity of whirling particles of the activated carbon continues to change from 0.81 meters per second to 0.41 meters per second and accordingly, the desired velocity of the whirling gas changes from 1.22 meters per second to 0.62 meters per second between the inlet and the outlet of the chute (FIG. 7C). The corresponding change of the permeability of the flow leading floor for the whirling medium between the inlet and the outlet of the chute is in this case attained in such a manner that the layers of filling bodies have in longitudinal direction of the whirl chute a stepwise ranging height or length similarly as illustrated in FIG. 3. In this example, the variation in height and length of respective layers takes place in six increments of stages as illustrated in FIG. 7D and indicated by reference letters A to F.

The diameters and the heights of respective intervals of the layers of filling bodies is determined by conventional computing methods in such a manner that a certain standard of the rate of flow of the whirling gas is predetermined and the desired velocities of the whirling gas in the respective ranges of the whirl chute will result therefrom.

As a whirl (i.e. fluidizing) gas in this example, there has been used combustion gas at a rate of flow of 115 m$^3$ per hour of a viscosity of $37 \times 10^{-6}$ NS/m$^2$, a density of 0.24 NS$^2$/m$^4$ and a temperature of 1,000° C. The employed filling bodies are of alumin oxide at an average diameter, as seen from FIG. 7D, of 2, 4 and 10 millimeters.

In the whirl chute designed according to this example the loss of activated carbon amounts to 2.8 percent per volume at a rate of flow of the activated carbon of 45 meters per hour.

Figure 8A:
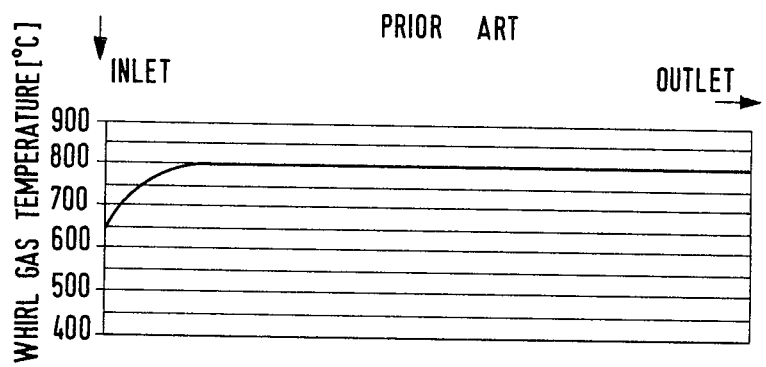
FIG. 8A is a plot diagram of another example of the whirl gas temperature versus the length of the whirl chute.
Figure 8B:
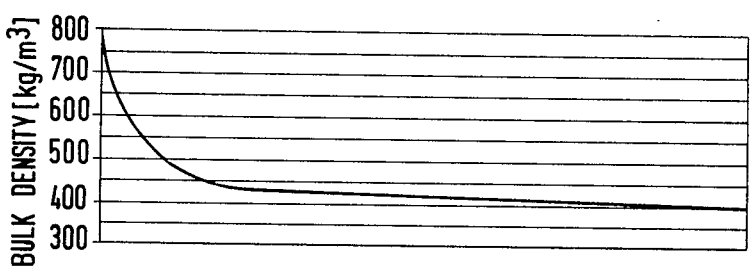
FIG. 8B is a diagram of bulk density versus the length of the chute.
Figure 8C:
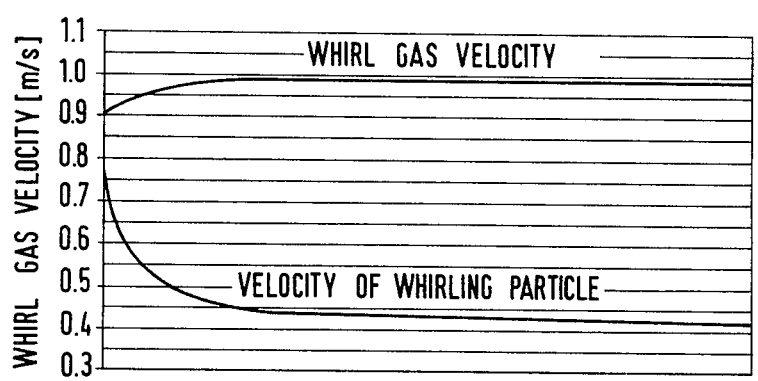
FIG. 8C is a plot diagram of whirl gas velocity versus the length of the chute.
Figure 8D:
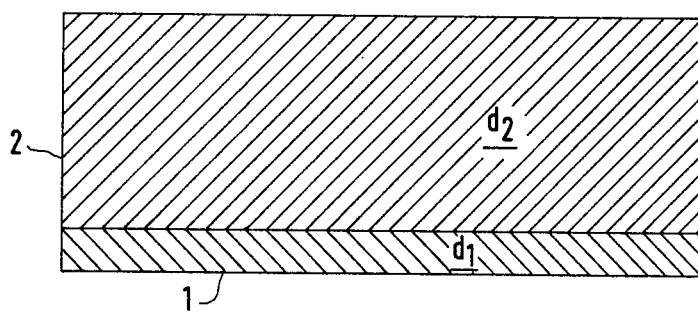
FIG. 8D is a cross-sectional side view of a multilayer flow leading floor of a whirl chute of prior art.

In a known modification of the whirl chute according to the above example, the flow leading floor is carried out in such a manner that its permeability to gas which according to the known state of the art is constant over the entire length of the whirl chute is in this modified example selected to be 0.99 meters per second at 800° C. and at a rate of flow of whirling gas of 140 m$^3$ per hour, the employed gas being the same as in the preceding example. Due to the fast temperature changes of the whirling gas along the whirl chute up to 800° C. at the outlet (FIG. 8A) and due to the fast decrease of the bulk density (FIG. 8B), the velocity of the whirling gas increases to 2.4 multiple of the whirling planes of the activated carbon at the outlet side (FIG. 8C). The structure of the layers of the filling bodies is seen from FIG. 8D. Because of the unfavorable ratio of whirling and broad spectra of treatment time resulting therefrom the loss of activated carbon at the same rate of flow of 45 liters per hour amounts to 9.5 percent by volume.

From comparison between the effect of the flow leading floor of whirl (i.e. fluidizing) chutes according to this invention and the prior art chutes having conventional flow leading floor the advantages of this invention are clearly apparent.

It will be understood that each of the elements described above, or two or more together, may also find a useful application in other types of constructions differing from the types described above.

While the invention has been illustrated and described as embodied in specific examples of gas flow leading floors for whirl (i.e. fluidizing) chutes, it is not intended to be limited to the details shown, since various modifications and structural changes may be made without departing in any way from the spirit of the present invention.

What is claimed as new and desired to be protected by Letters Patent is set forth in the appended claims:

1. In a fluidized-bed channel for treating a flow of solid particles introduced at an inlet end and discharged at an outlet end of the channel, a combination comprising wall means defining the channel, including a bottom wall adapted for introducing into the channel a fluidizing gas to impart to said particles a fluidizing motion in vertical direction and to advance said particles in longitudinal direction from said inlet end to said outlet end; and filling-body layer means, including at least one layer of filling bodies arranged on said bottom wall and having successive portions of different heights and therefore of different gas permeability in the direction of advance of said particles, in accordance with the desired fluidizing speed of said particles.

2. A combination as defined in claim 1, said layer means further including an uppermost layer of filling bodies of uniform size, said layer having a uniform height.

3. A combination as defined in claim 1, wherein said filling bodies in successive ranges of said layer have different sizes.

4. A combination as defined in claim 1, wherein said bottom wall includes an inclined grate supporting said at least one layer of filling bodies having uniform size, the height of said layer decreasing in the direction of ascent of said grate.

5. A combination as defined in claim 1, wherein said bottom wall includes a plurality of superposed ones of layers of said filling bodies, said bodies of each layer having substantially the same size but differing in size from other layers and the height of at least two layers varying lengthwise of the channel.

6. A combination as defined in claim 5, wherein the height of said layers changes continuously.

7. A combination as defined in claim 5, wherein the height of at least two layers changes intermittently.

8. A combination as defined in claim 1, said layer means further including a lowermost layer of filling bodies of uniform size, said lowermost layer having a uniform height.

9. In a fluidized-bed channel for treating a flow of solid particles introduced at an inlet end and discharged at an outlet end of the channel, a combination comprising wall means defining the channel, including a substantially horizontally arranged gas-permeable bottom wall adapted for introducing into the channel a fluidizing gas to impart to said particles a fluidizing motion in vertical direction and to advance said particles in longitudinal direction from said inlet end to said outlet end; and at least one uniform-height layer of filling bodies arranged on said bottom wall and having different gas permeability in the direction of advance of said particles due to the size of said filling bodies changing progressively in said direction.

* * * * *